US011176941B1

(12) United States Patent
Hoit et al.

(10) Patent No.: US 11,176,941 B1
(45) Date of Patent: Nov. 16, 2021

(54) SYSTEM AND METHOD FOR INTERPRETING DATA TRANSFER FROM A VOICE RECOGNITION FRONT END

(71) Applicant: Connected Living, Inc., Quincy, MA (US)

(72) Inventors: Sarah Hoit, Hingham, MA (US); Brian McWade, Wrentham, MA (US); Josiah Strandberg, Providence, RI (US)

(73) Assignee: Connected Living Technology, LLC, Quincy, MA (US)

(*) Notice: Subject to any disclaimer, the term of this patent is extended or adjusted under 35 U.S.C. 154(b) by 71 days.

(21) Appl. No.: 16/665,424

(22) Filed: Oct. 28, 2019

Related U.S. Application Data

(60) Provisional application No. 62/750,924, filed on Oct. 26, 2018.

(51) Int. Cl.
| | |
|---|---|
| *G10L 15/00* | (2013.01) |
| *G10L 15/22* | (2006.01) |
| *G06F 3/16* | (2006.01) |
| *G10L 15/18* | (2013.01) |
| *G06F 3/0484* | (2013.01) |
| *G10L 15/30* | (2013.01) |
| *G06F 40/30* | (2020.01) |
| *G10L 15/26* | (2006.01) |

(52) U.S. Cl.
CPC .......... *G10L 15/22* (2013.01); *G06F 3/04842* (2013.01); *G06F 3/167* (2013.01); *G06F 40/30* (2020.01); *G10L 15/18* (2013.01); *G10L 15/26* (2013.01); *G10L 15/30* (2013.01); *G10L 2015/223* (2013.01)

(58) Field of Classification Search
CPC ......... G10L 15/22; G10L 15/26; G10L 17/22; G06F 16/3329
See application file for complete search history.

(56) References Cited

U.S. PATENT DOCUMENTS

| | | | |
|---|---|---|---|
| 10,825,454 B1* | 11/2020 | Mutagi | G10L 15/22 |
| 2011/0161077 A1* | 6/2011 | Bielby | G10L 15/32 |
| | | | 704/231 |
| 2015/0066479 A1* | 3/2015 | Pasupalak | G10L 15/30 |
| | | | 704/9 |
| 2020/0042334 A1* | 2/2020 | Radebaugh | G06F 9/453 |
| 2020/0409657 A1* | 12/2020 | Aiken | G10L 15/22 |
| 2021/0027785 A1* | 1/2021 | Kahan | G10L 15/26 |

\* cited by examiner

*Primary Examiner* — Daniel Abebe
(74) *Attorney, Agent, or Firm* — K&L Gates LLP

(57) ABSTRACT

A method and system for interpreting data transfer from a voice recognition platform. The voice recognition platform data transfer may include a designator, device identification, a command or query, and a plurality of variables. The voice recognition string from the voice recognition platform may include the designator, the query, and at least one variable of the plurality of variables. Further, the method may include generating an instruction string from the recognition string. The instruction string may include the designator, the query and the at least one variable of the plurality of values. The method may include removing extraneous symbols from the instruction string to generate a cleaned instruction string comprising the designator, a cleaned query, and a cleaned variable of the at least one variable of the plurality of variables. The method may include searching a context platform database for data corresponding to the cleaned query.

20 Claims, 7 Drawing Sheets

SYSTEM AND METHOD FOR INTERPRETING DATA TRANSFER FROM A VOICE RECOGNITION FRONT END

CROSS-REFERENCE TO RELATED APPLICATIONS

This application claims priority to and the benefit of U.S. Provisional Patent Application No. 62/750,924, filed on Oct. 26, 2018, the entire disclosure of which is incorporated by reference herein.

FIELD OF THE INVENTION

The invention relates generally to a method to interpret data transferred from a voice recognition platform and more specifically to identify a query from data from a voice recognition platform.

BACKGROUND

Specialized voice recognition systems are now being used as general purpose voice recognition systems, providing voice interpretation data to other back-end specialized computer platforms which then act on that data. Such specialized back-end computer platforms may provide answers to users' queries, for example in response to questions posed to a smart phone. Other specialized back-end computer platforms may be context- or community-based, providing specialized information to a defined group of users. Examples of such context- or community-based systems are those providing information and other assistance to residents of assisted living facilities, or systems providing menu, transportation, activity and entertainment information to hotel guests.

The specialized voice recognition systems are frequently located on the internet cloud and are generally referred to as Intelligent Cloud Voice Recognition (ICVR) services. Such ICVR services receive voice queries or commands from a user's voice transceiver and provide interpreted query or command data to the context- or community-based back-end specialized computer platforms that may be located anywhere.

Examples of such general purpose cloud based Intelligent Cloud Voice Recognition (ICVR) services are: Amazon Alexa®, Apple Siri®, Ok Google®, Microsoft Cortana®, etc. These services are also generally able to interpret certain queries or commands and, in response to those queries or commands, access and provide generally available information through internet search capabilities. Such services may also be optimized to do specific tasks by interacting with specific back-end applications or databases. An example of this is the use of ICVR services to interpret a command to cause a smart phone to dial a specific person in the user's contact list in response to a command issued by the user and interpreted by a voice recognition system in the cloud.

Although the ICVR systems are trained to recognize such commands or queries by listening to large numbers of users speaking the same command or query, there may be a problem in identifying the relevant query or command in the user's spoken command. If an ICVR system cannot identify the command or query and therefore is unable to pass the data corresponding to the command or query to the back-end specialized platform, the front end ICVR may pass an unprocessed text string to the back-end specialized computer platform.

For example, if the user said "Call Bob" to his or her voice transceiver, the ICVR may return the text string "Call Bob" to the back-end specialized computer platform. However, some words are difficult to distinguish either due to the accent of the user or due to being homonyms. For example, if the user said the word "residents" the ICVR might transfer to the back-end specialized computer platform one or the other or both of the text strings "residents" and "residence." This ambiguity may be better resolved by the back-end specialized computer platform because such a system may then analyse the context in which the word was used. This resolution of the meaning of the word being uttered is termed disambiguation.

The present invention relates to a method and apparatus to disambiguate the text strings sent by an ICVR service to a back-end specialized computer platform.

SUMMARY OF THE INVENTION

In one aspect, the present application relates to a method for interpreting data transferred from a voice recognition platform. In one embodiment, the data transferred from a voice recognition platform includes a designator, device identification, a command or query, and a plurality of variables. In another embodiment, the method includes the steps of receiving, by a context platform, a recognition string from the voice recognition platform, the recognition string comprising the designator, the query or command, and at least one variable of the plurality of variables. In yet another embodiment, the method includes a context platform generating an instruction string from the recognition string. In still yet another embodiment, the instruction string includes the designator, the query or command, and the at least one variable of the plurality of variables. In one embodiment, the method includes removing extraneous symbols from the instruction string to generate a cleaned instruction string comprising the designator, a cleaned command or query, and at least one cleaned variable of the plurality of variables.

In another embodiment, the method includes searching a context platform database corresponding to the designator for context platform data corresponding to the cleaned query or clean command to generate a list of designator data entries. In yet another embodiment, the method includes searching the list of designator data entries for an exact match between the designator data entries and the at least one cleaned variable. In still another embodiment, if an exact match exists, the method returns the designator data entries corresponding to the exact match with the at least one cleaned variable.

In still yet another embodiment, if an exact match does not exist, the method looks for a partial match between the designator data entries and the cleaned variable. If a partial match exists, the method returns designator data entries corresponding to the partial match between the designator data entries and the at least one cleaned variable. In another embodiment, if the partial match does not exist, the method divides the at least one cleaned variable of the plurality of variables into a list of individual cleaned variables. In another embodiment, the method searches the list of designator data entries for an exact match between the designator data entries and each cleaned variable in the list of the plurality of cleaned variables sequentially starting with the first cleaned variable in the list.

In another embodiment, as each variable in the list is searched, the method returns the designator data entries that correspond to the first variable matched in the sequential search. In still another embodiment, if multiple designator data entries are found, the method returns all designator data entries. In yet another embodiment, if no designator entries are found, the method returns a default value.

In one embodiment, the search of the database includes the searching of a plurality of data tables. In another embodiment, the plurality of data tables includes data for communities, programs, device identification, various events, menu, photos, videos, and notices. In yet another embodiment, the method further includes packaging the recognition string into JavaScript Object Notation packages to transmit and receive the recognition string. In still yet another embodiment, the searching of the database includes only searching the data tables that are relevant to the query, community, and program of the device.

In another aspect, the invention relates to a context platform for connecting to and interpreting data transfer from a voice recognition platform. In one embodiment, the voice recognition platform data transfer includes a designator, device identification, a query or command, and at least one variable of a plurality of variables. In another embodiment, the context platform includes a context platform memory; a context platform processor in communication with the context platform memory; and a context platform database in communication with the context platform processor, the context platform database comprising a plurality of datasets, each dataset corresponding to a respective designator. In yet another embodiment, the context platform memory receives and stores a recognition string from the voice recognition platform. In still another embodiment, the recognition string includes the designator, the query or command, and at least one variable of a plurality of variables.

In still yet another embodiment, the context platform processor generates an instruction string from the recognition string and the instruction string includes the designator, the query or command, and the at least one variable of the plurality of values. In another embodiment, the context platform processor removes extraneous symbols from the instruction string to generate a cleaned instruction string comprising the designator, a cleaned query or cleaned command, and at least one cleaned variable of the plurality of variables. In still another embodiment, the context platform processor searches the context platform database corresponding to the designator for designator data entries corresponding to the cleaned query or cleaned command to generate a list of designator data entries corresponding to the cleaned query or cleaned command. In yet another embodiment, the context platform processor searches the list of designator data entries for an exact match between the designator data entries and the cleaned variable, and if an exact match exists, returns the matched designator data entries.

In still yet another embodiment, if an exact match does not exist, the context platform processor searches for a partial match between the designator data entries and the cleaned variable. If a partial match exists, the context platform processor returns the designator data entries corresponding to the partial match. In another embodiment, if a partial match does not exist, the context platform processor divides the at least one cleaned variable of the plurality of cleaned variables into a list of individual cleaned variables, and sequentially searches the designator data entries for an exact match between the designator data entries and each cleaned variable in the list of the plurality of variables, starting with the first cleaned variable in the list. In another embodiment, as each cleaned variable in the list is searched, the context platform processor returns the designator data entries that correspond to the first cleaned variable matched in the sequential search, and if multiple designator data entries are found, returns all designator data entry found that correspond to the first cleaned variable matched in the sequential search; if no designator data entries are found, a default value is returned.

In one embodiment, the search of the context platform database includes searching a plurality of data tables. In another embodiment, the plurality of data tables includes data for communities, programs, device identification, various events, menu, photos, videos, and notices. In yet another embodiment, the recognition string is packaged into JavaScript Object Notation packages by the voice recognition platform for transmission. In still yet another embodiment, the context platform processor only searches the data tables that are relevant to the query, community, and program of the device when searching the database.

In another aspect, the invention relates to a computer system for interpreting voice queries. In one embodiment, the system includes a voice recognition platform generating a recognition string comprising a designator, device identification, a query or command, and a plurality of variables in response to a voice query by a user. In one embodiment, the voice recognition platform is in communication with a context platform. In yet another embodiment, the context platform includes a context platform communication module, in communication with the voice recognition platform and capable of receiving the recognition string from the voice recognition platform, and a context platform database, configured to interface with the context platform communication module and comprising a plurality of application programming interfaces. In another embodiment, the voice recognition platform receives a query or command from a user comprising at least a designator, a query or command, and a plurality of variables. In still yet another embodiment, the context platform generates an instruction string from the recognition string, the instruction string comprising the designator, the query and the at least one variable of the plurality of values.

In another embodiment, the context platform removes extraneous symbols from the instruction string to generate a cleaned instruction string comprising the designator, a cleaned query or command, and a cleaned variable of the plurality of variables. In yet another embodiment, the context platform searches the plurality of application programming interfaces on the context platform database corresponding to the designator for data corresponding to the cleaned query or cleaned command to generate a list of designator data entries. In still another embodiment, the context platform searches for an exact match between the designator data entries and the cleaned variable, and, if an exact match exists, returns the matching designator data entries.

In still yet another embodiment, if an exact match does not exist, the context platform looks for a partial match between the designator data entries and the cleaned variable. If a partial match exists, the context platform returns designator data entries corresponding to the partial match as a response string. If a partial match does not exist, the context platform divides the at least one cleaned variable of the plurality of cleaned variables into a list of individual, cleaned variable components, and searches the designator data entries for an exact match between the designator data entries and each cleaned variable component sequentially starting with the first cleaned variable component in the list. As each variable in the list is searched, the designator data entries that correspond to the first variable matched in the sequential search is returned as a response string. If multiple designator data entries are found, all designator data entries are returned as a response string, and if no designator entries are found, a default response is returned as a response string.

In another embodiment, the context platform database includes a plurality of data tables. In yet another embodiment, the plurality of data tables includes data for communities, programs, device identification, various events, menu, photos, videos, and notices. In still another embodiment, the recognition string is packaged into JavaScript Object Notation packages by the voice recognition platform. In another embodiment, a search by the context platform only searches the data tables that are relevant to the query, community, and program of the device when searching the context platform database.

BRIEF DESCRIPTION OF DRAWINGS

Various features of the embodiments described herein, together with advantages thereof, may be understood in accordance with the following description taken in conjunction with the accompanying drawings in which.

DETAILED DESCRIPTION

Figure 1:
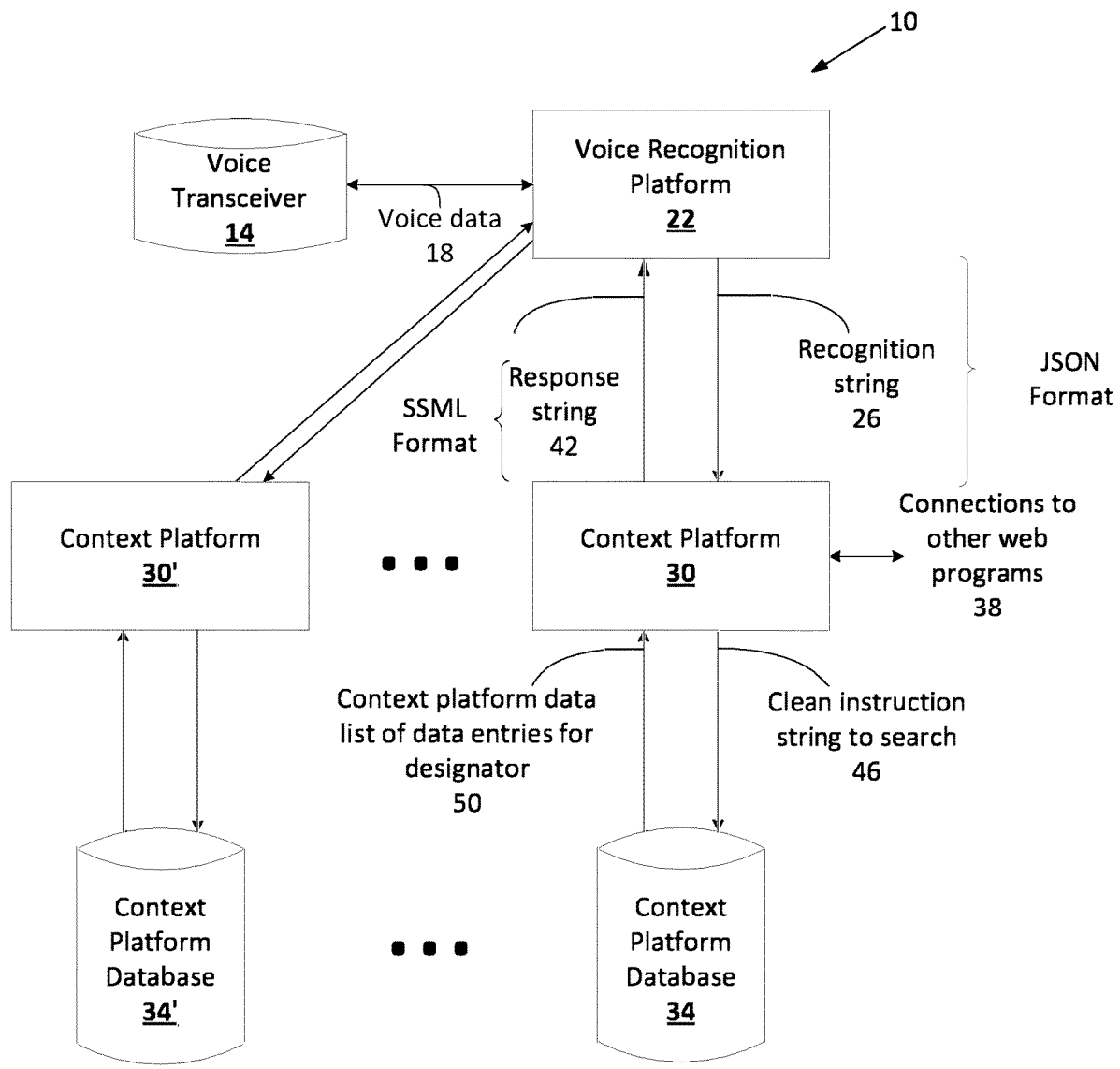
FIG. 1 is a block diagram of an embodiment of a system constructed in accordance with the invention.

In the following detailed description, reference is made to the accompanying drawings, which are herein included as a portion of the present disclosure. In the drawings, similar symbols and reference characters typically identify similar components throughout the several views, unless context dictates otherwise. The illustrative aspects described in the detailed description, drawings, and claims are not meant to be limiting. Other aspects may be utilized, and other changes may be made, without departing from the scope of the subject matter presented in the present disclosure.

In brief overview, a system 10 is constructed in accordance with the present invention is shown in FIG. 1. System 10 includes a user voice transceiver 14 to transmit instructions or queries 18 in digitized voice from a user to an Intelligent Cloud Voice Recognition (ICVR) service platform 22, and return a result to the user. This ICVR service system interprets the voice command or query and sends an interpreted version of the command or query (recognition string 26), to a back-end specialized computer platform (context platform 30), for action. The context platform 30 accesses its local database 34 or the network 38 for the information required to address the command or query. When the context platform 30 fulfills the command or answers the query, it sends a response string 42 as a JavaScript Notation (JSON) packet back to the voice recognition platform 22 for transfer back to the user's voice transceiver 14 for audio broadcast to the user.

Figure 2:
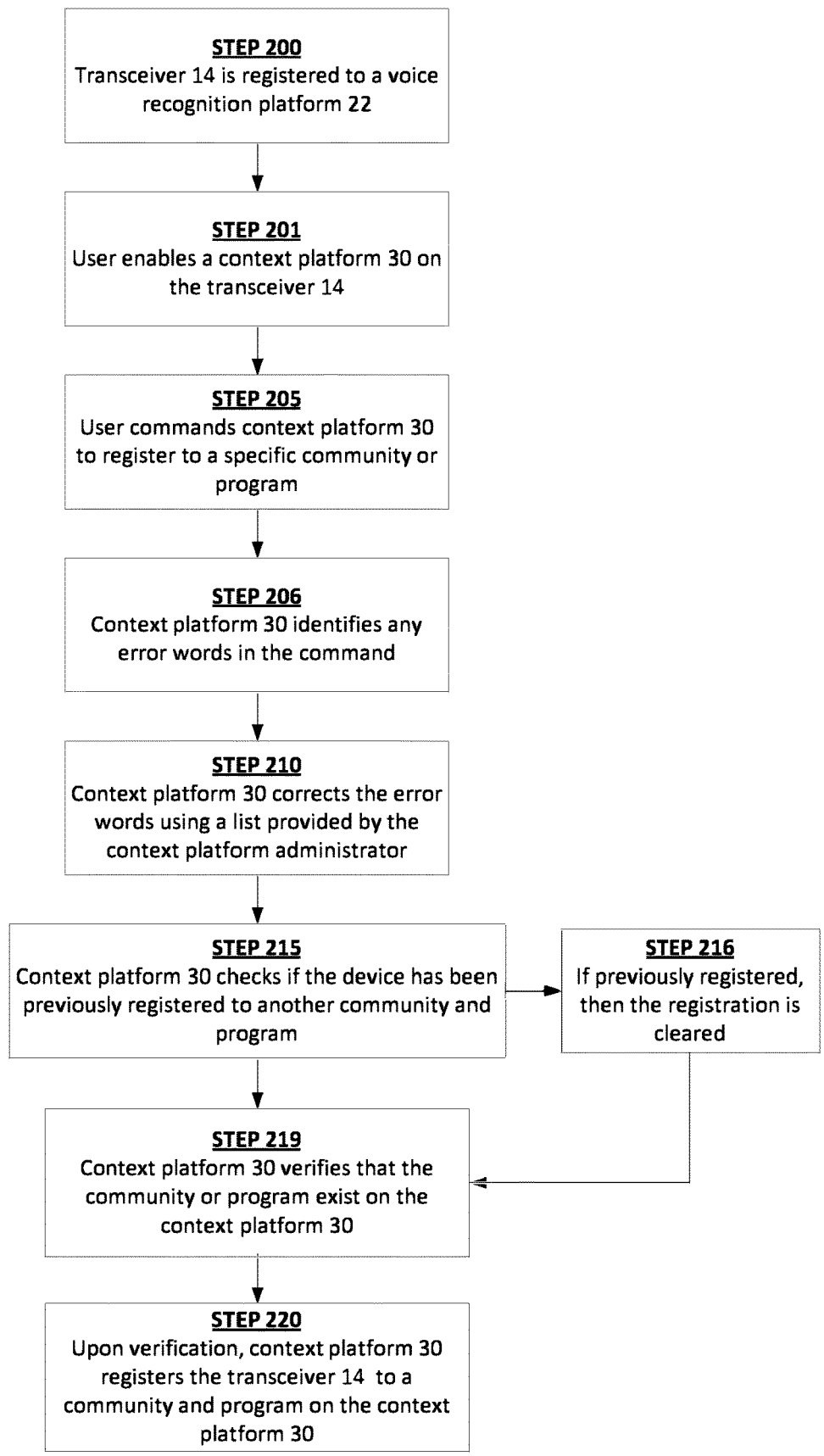
FIG. 2 is a flow diagram of the steps of an embodiment of a method of registering a system according to the invention.

Considering each component individually, the user's voice transceiver 14 typically includes a small speaker and microphone which receives voice commands or queries from a user and which is connected to the voice recognition platform 22 through the network either with a wired or wireless connection. The user's voice transceiver 14 may, for example, be in various embodiments, such as one of Amazon Echo® (Amazon.com, Inc., Seattle Wash.), Google Home® (Alphabet, Inc., Mountain View Calif.), Apple Homepod® (Apple, Inc., Palo Alto Calif.), or any other suitable voice transceiver 14, such as a smart phone or computer. In some embodiments, the transceiver 14 includes a visual display. Initially, the transceiver is registered to a corresponding cloud-based server by the manufacturer (step 200 in FIG. 2). For example, an Amazon Echo® transceiver will be registered to the cloud-based Amazon server.

For the system 10 to function, it is necessary to have two major linkages occur. First, an association with the context platforms 30 is downloaded and enabled on the voice recognition platform 22 (step 201) through a smartphone device paired to the voice recognition platform 22. A single ICVR may act as the front end voice recognition platform 22 to hundreds of context platforms 30, each having many communities. For example, ICVR-1 may host or act as the front end for a context platform 30, for example "Connected Living, which has a series of retirement homes (Home-A, Home-B, etc.), each having a number of programs (Home-A-Long Term Community, Home-A-Short Term Community, Home-A-Staff, Home-B-Short Term Community, Home-B-Staff) as well as hosting a number of Hotel chains (Hotel-A, Hotel-B, Hotel-B-Resort, Hotel-B-NYC).

Second, the user must then register his or her transceiver 14 to a particular community or program within the context platform 30 (step 205). Registering the transceiver 14 in accordance with the process shown in FIG. 2, allows the context platform 30 to provide responses associated with the transceiver 14. For example, a user of Home-A-Long Term Community will register (step 205) the transceiver 14 to that community and program in the context platform 30. Any subsequent queries asked by that user will only return responses related to Home-A-Long-Term Community instead of Home-A-Short-Term Community, or a completely different community, Home-B. Specifically, when the voice recognition platform 22 receives a query from a user, the designator in the query is used to search for the intended context platform 30. For example, the user may command, "Alexa, ask Connected Living where is yoga today?" In this example, the designator is "Connected Living" and identifies the context platform 30 and the designated community; the command or query is "Where is" and the variables in this example are "yoga" and "today."

In more detail, the context platform 30 is programmed to identify and define any particular error words that may be used by a user when giving a command or asking a query to the voice recognition platform 22. For example, a user registering for the "Covent Garden" community may erroneously say "Convent Garden." The context platform 30 uses a set of error words defined by an administrator to recognize the user's potential errors (step 206) and will subsequently correct the error word (step 210).

Once the context platform 30 has processed the community and associations in a command to register, the context platform 30 will verify that the transceiver 14 has not been previously registered to a different community (step 215). If the transceiver 14 was been previously registered, the old registration is cleared (step 216). The context platform will also verify that the community and program stated in the query are valid by confirming the community and program exist on the context platform, and the program is in fact associated with the particular community (step 219). The transceiver 14 is registered to a particular community and program (step 220). The context platform 30 then enters the identification number of the transceiver 14, the device type of the transceiver 14 (i.e. the device includes a display interface, the device is audio only, etc.), and the corresponding community and program information into the context platform databases 34.

Figure 3:
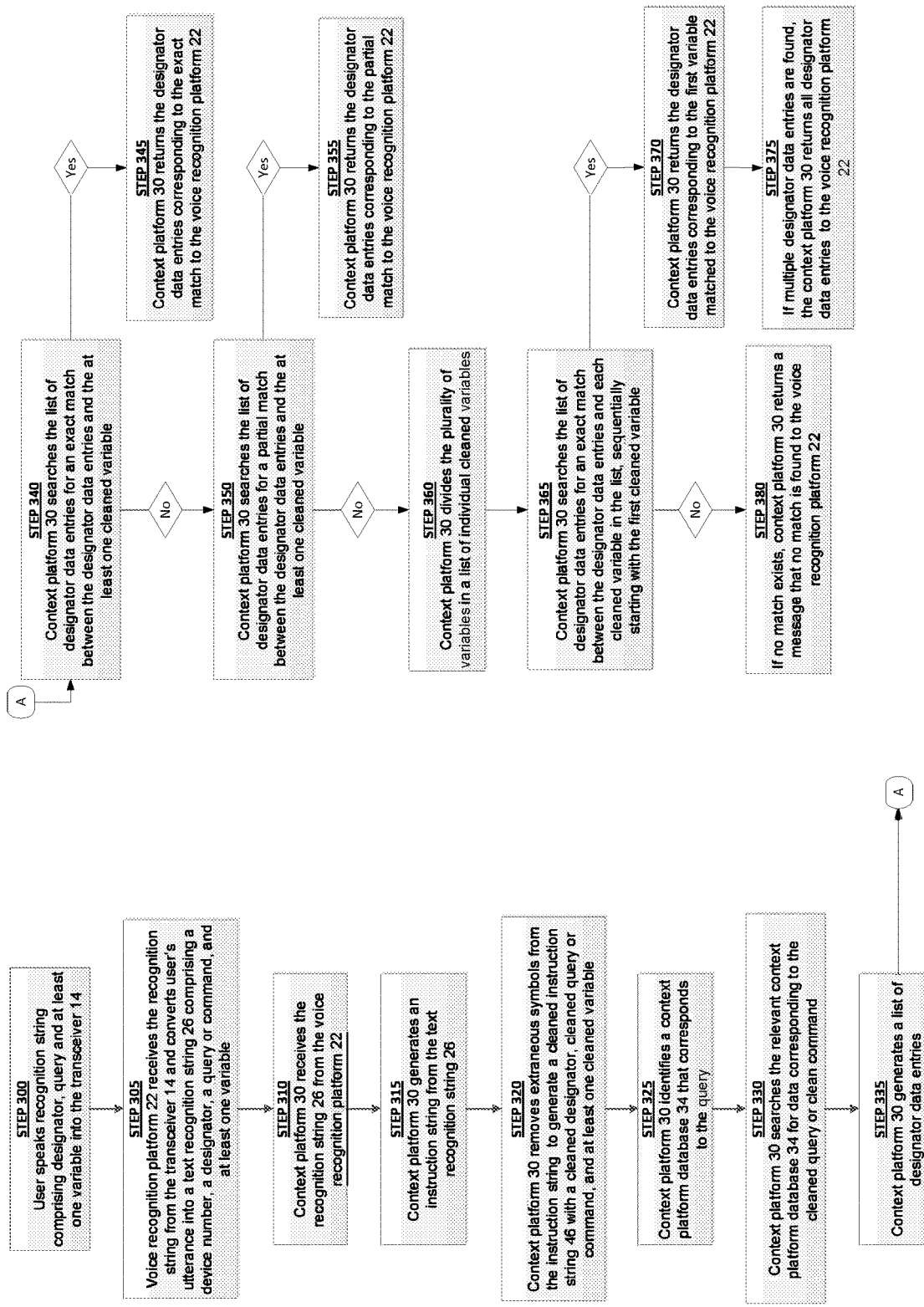
FIGS. 3A and 3B are a flow diagram of an embodiment of the operation of a system implementing the method of the invention.

As illustrated in FIGS. 3A and 3B, when the voice recognition platform 22 receives the command or query from the user's voice transceiver 14 (step 300), it processes the spoken words into a recognition string 26 (step 305). In step 310, the recognition string 26 is transmitted to the context platform 30 for action.

For example, in the case of the Amazon Echo transceiver, the Echo is connected through the network to the Amazon server. When the Amazon server (voice recognition platform 22) receives a command, it translates the recognized command to one from a command list. An entry in the command list includes an "Intent," such as, but not limited to, "Get Menu," "Get Event," and "Register." The voice recognition platform 22 then generates a text recognition string 26 including a "designator" that is an indication of the context platform 30 used to handle the command, a command or query such as, but not limited to, "Where is," "When is," and "What is," and one or more variables related to the command or query such as, but not limited to, "dinner," "tomorrow," "next Friday." The voice recognition platform 22 divides the text in the text recognition string 26 into "key-value" pairs. Each "key" represents a category, and the "values" represent the information related to that category. For example, if a command includes (e.g. "register") the key "community," then only values associated to that category are permitted, such as "Home-A-Long-Term Community," "Home-A-Short-Term Community," "Home-B-Long-Term Community," "Home-B-Short-Term Community," and so on. Next, the voice recognition platform 22 packages the text recognition string 26 into a JavaScript Object Notation (JSON) packet for transmission to the context platform 30.

Although this discussion thus far has been in terms of the Alexa embodiment, other systems utilize similar text recognition strings 26. That is, each voice recognition platform 22 generates a text recognition string 26 (step 305) that includes: the identification number of the transceiver 14, a "designator" that identifies the context platform 30 to which the text string is to be sent; a query or command that describes the response sought by the user; and a plurality of variables that may correspond to a variety of factors related to the response, including but not limited to, dates, times, locations, people, or any other relevant variable.

Once the context platform 30 receives the text recognition string 26, it first generates an instruction string (step 315). The context platform 30 then cleans the instruction string to remove extraneous characters (step 320). Extraneous characters include ",", "I" and so on. The context platform 30 uses the cleaned instruction string 46 to search one or more databases 34 associated with the context platform 30 (step 325).

In various embodiments, cleaning is the process of converting a request, command, or other input into a string that will accurately retrieve appropriate information from our database. The user speaks into a voice service device and the voice service device turns that request into an English text string. The voice service provider tries to match the text string to utterances defined in the skill/app. The utterances are associated with an intent, such as "get menu". They comprise fixed text strings and variable text strings (variables). A request associated with an utterance and variables in which they match. In the utterance "What's for lunch", the fixed text string is "What's for" and the variable text string is "lunch". It is variable because it could be "lunch", "breakfast", "brunch", etc.

A second example is the register intent. The register intent is associated with an utterance such as "Register me for Crown Colony Assisted Living". Here the fixed text string is "Register me for" and there are two variable text strings" "Crown Colony" (a community), and "Assisted Living" (a program). The user may have pronounced the variables in a way that the voice service provider software, such as a parser is unable to determine which part is the community and which part is the program. The "cleaning" activity or function of the context platform includes determining what is the "community" and "program" that would match and reflect the user's actual intention.

The context platform databases 34 searched (step 325) are specific to the "query" listed in the text recognition string 26. The context platform 30 may designate specific context platform databases 34 that may be configured to hold data related to a subset of users or types of data to help reduce the amount of data being searched in order to speed up the search (step 330). The context platform 30 then generates a list of designator data entries (step 335) comprising data related to that subset of users.

In operation, the context platform 30 searches the context platform databases 34 for an exact match to both the query and the plurality of variables in the cleaned instruction string 46 (step 340). If an exact match exists, the corresponding data entries are returned by the context platform to the voice recognition platform for transmission to the voice transceiver as a response to the user (step 345).

If an exact match for the cleaned query is not found in the designator database, then the database is searched (step 350) for a partial or related match. For example, if the vocal query uttered by the user includes the phrase "dance class," the text string provided by the voice recognition platform may have included "Dan's class" rather than "dance class." Further, the database may include data relating to "Dan's drawing class" and a "cooking class" and thus have a partial match with the entry "class." The database search may therefore retrieve information for either or both of "Dan's drawing class" or "cooking class." The corresponding data entries for these partial or related matches are then provided to the voice recognition platform to be provided as a response to the user (step 355).

If neither an exact match nor a partial match for the cleaned query is found in the designator database, the plurality of variables is decomposed into a list of individual variables (step 360), and an exact match for each of the variables is searched for sequentially starting with the first variable in the list (step 365). As each variable is searched, data entries that correspond to the first variable matched in the sequential search are provided to the voice recognition platform as a response to the user through the voice transceiver (step 370). If multiple designator data entries are found, then all corresponding data entries are returned to the user (step 375). If no data entries are found, then a default response is provided to the user via the voice recognition platform (step 380).

If the voice recognition platform 22 is unable to understand the query or command and hence unable to find the query or command in a skill list, the voice recognition platform 22 may interpret the query or command based on the closest match found on a list of frequently used queries and commands (depending upon the embodiment). The voice recognition platform 22 then passes the query or command as a text string to the context platform 30.

In some embodiments, the context platform databases 34 may interface with a connected application on a computing device, including cellular phones, tablets, and computers. In these embodiments, users may access data stored in the context platform databases 34 through either the system 10 or through the connected application. Similarly, notifications or alerts received on the system 10 may be accessed by users upon request on a connected application or vice versa.

Figure 4:
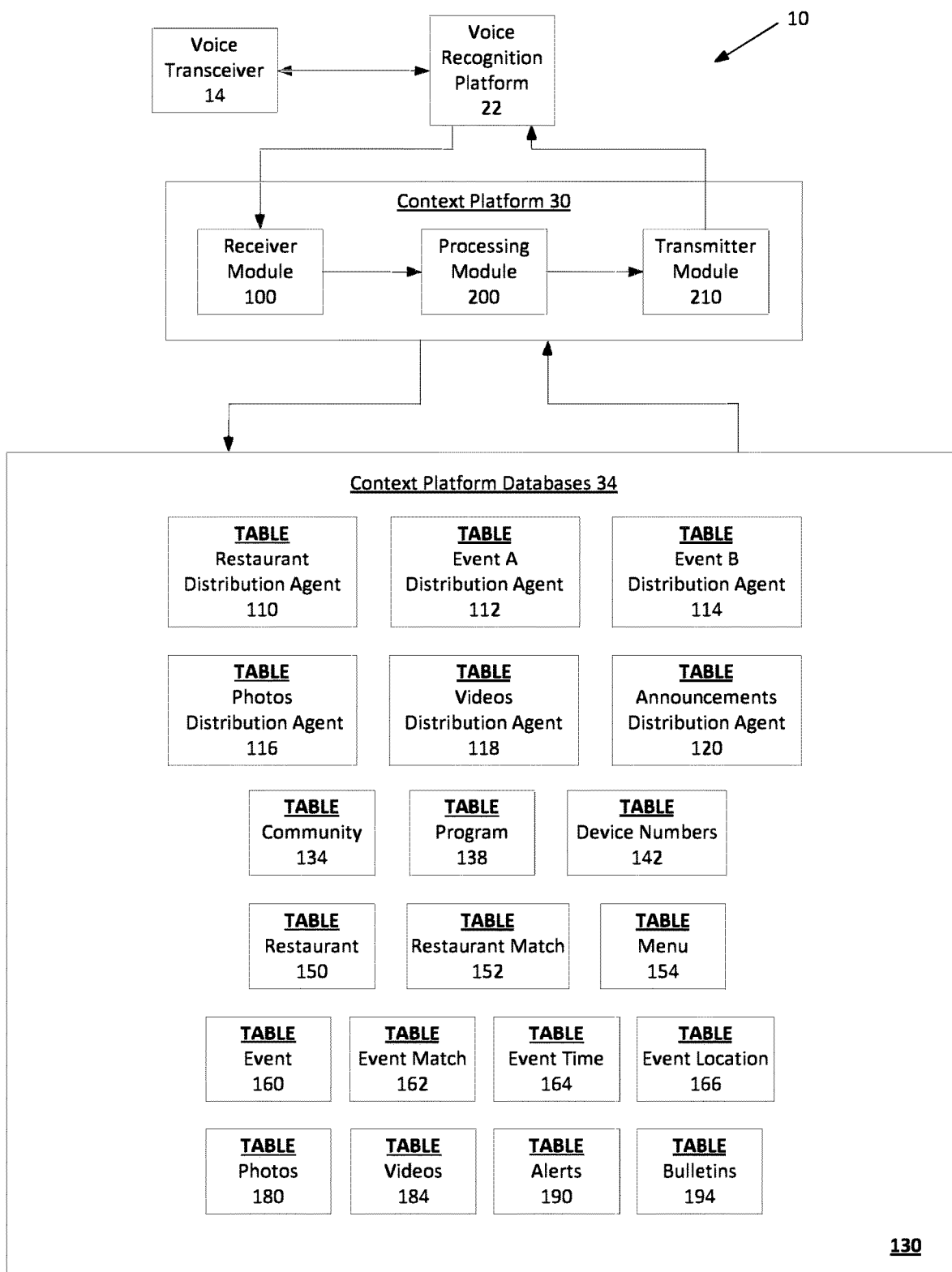
FIG. 4 is a block diagram overview of an embodiment of the context platform with various data tables in a database.

In more detail, FIG. 4 illustrates a block diagram of the software components of the context platform 30. The context platform 30 includes one or more programs and a database 34 of tables which are used to receive, process, and respond to user queries. The context platform 30 includes a receiver 100 to receive JSON data packets from the ICVR platform 22. The receiver 100 receives the query including data related to the identity of the user's device. This data is used to determine the community and program from the context platform database(s) 34. The context platform databases 34 also include one or more data tables that are distribution agents 110, 112, 114, 116, 118, 120 (generally 110). The one or more distribution agents 110 contain information on how to match each query to the corresponding responses in one or more tables (generally 130). In some embodiments, the one or more distribution agents 110 may each be dedicated to a single category of information, such as dining 110, one for each type of event 112, 114 (such as "yoga," "dance class," etc.), photos 116, videos 118, or announcements 120. Each distribution agent comprises information for all communities and community programs on the context platform 30. The one or more distribution agents 110 are capable of matching the queried information to the corresponding entries on the one or more data tables (generally 130) on the context platform databases 34.

The one or more data tables 130 in one embodiment are organized according to one or more categories. In one embodiment, one or more data tables 130 comprise a complete list of all the communities (located in table 134) and community programs (located in table 138) using the context platform 30. The community table 134 and the program table 138 are used to correctly identify the community and program to during the registration of the device 14. The context platform 30, in various embodiments, includes a data table 142 of the devices and their corresponding communities and programs. This device data table 142 in various embodiments comprise information to identify and verify the device, including a device serial number, personal identification number (PIN), device key, internet service provider (ISP) number, or any other suitable identification number.

The context platform databases 34 in various embodiments also comprise data tables based on categories of various community information. In some embodiments, these data tables 130 may include information related to dining, including locations and restaurants in table 150, menus in table 154, and the times during which the various menus apply. The context platform databases 34 also comprise one or more data tables (generally 130) for information related to various community events in table 160, including information related to type of event 160, time and date 164, and location 166. Other data tables 180, 184 may comprise content related to photographs and videos, respectively, either belonging to the community or the individual users. The one or more data tables 190, 194 also comprise messages or announcements, respectively, related to the community or individual user. Additional data tables provide information how data in one table corresponds to data in another table. For example, a "Restaurant Match" table 152 may match the data entries in the "Restaurant" table 150 with the relevant data entries in the "Menu" table 154. Similarly, an "Event Match" table 162 may match the data entries in the "Event" table 160 with the relevant data entries in the "Event Time" 164 and "Event Location" 166 tables. This is done, for example, because various dining locations or restaurants may access the same memory.

In an exemplary embodiment, the one or more distribution agents 110 are used to find information from the data tables 130 based on the user query. The data is retrieved by the context platform 30 in any suitable format, including Unicode format. The processing module 200 on the context platform 30 converts the retrieved data into a character string. The character string is converted into a sentence string with appropriate modifications made using Speech Synthesis Markup Language (SSML). These modifications may include pauses and intonations to mimic user speech. The final sentence string comprising SSML characters is packaged into a JSON packet and transmitted to the ICVR device.

Figure 5A:
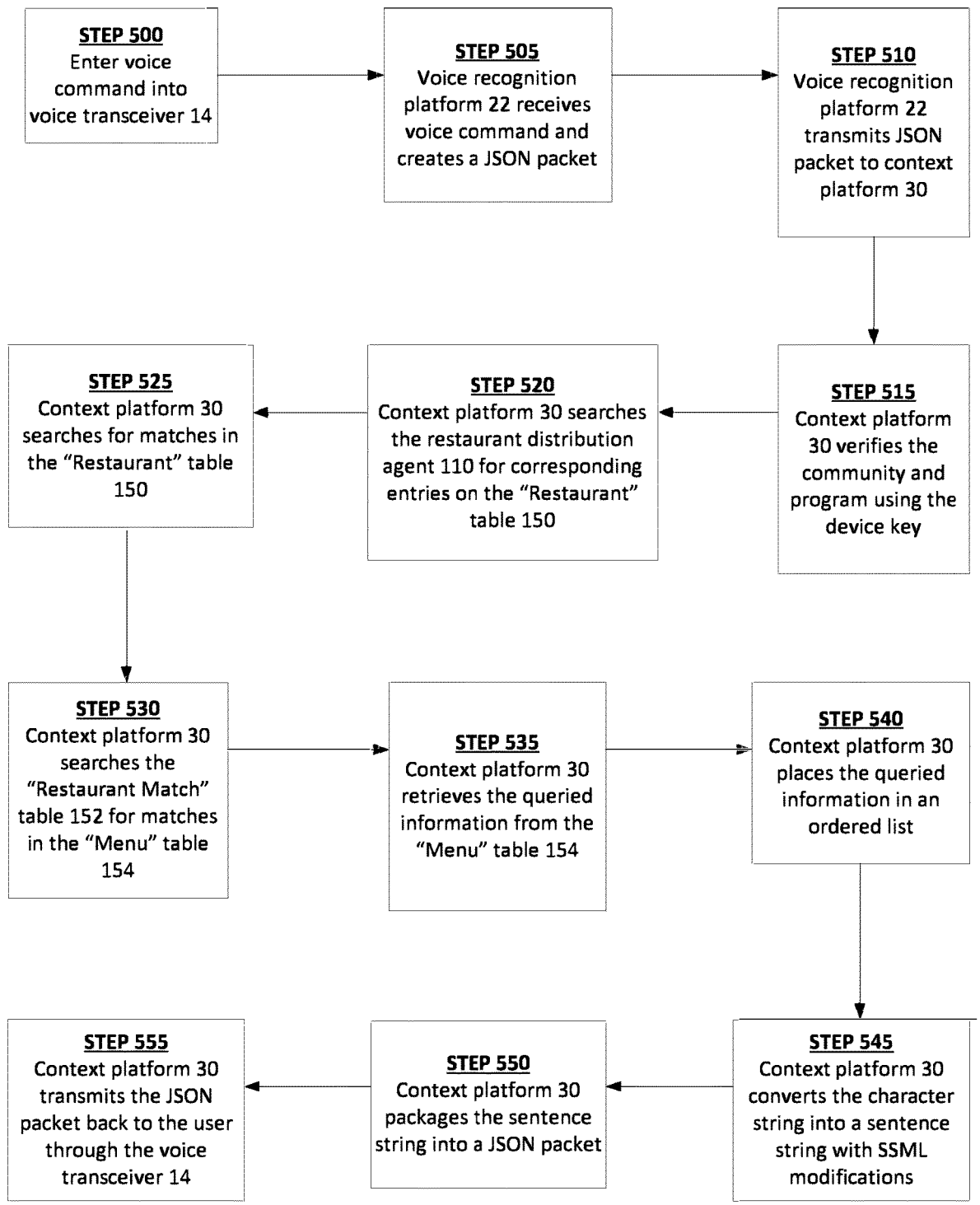
FIG. 5A is a flow diagram of an embodiment of the steps utilized by the system to respond to a query from a user regarding dining.
Figure 5B:
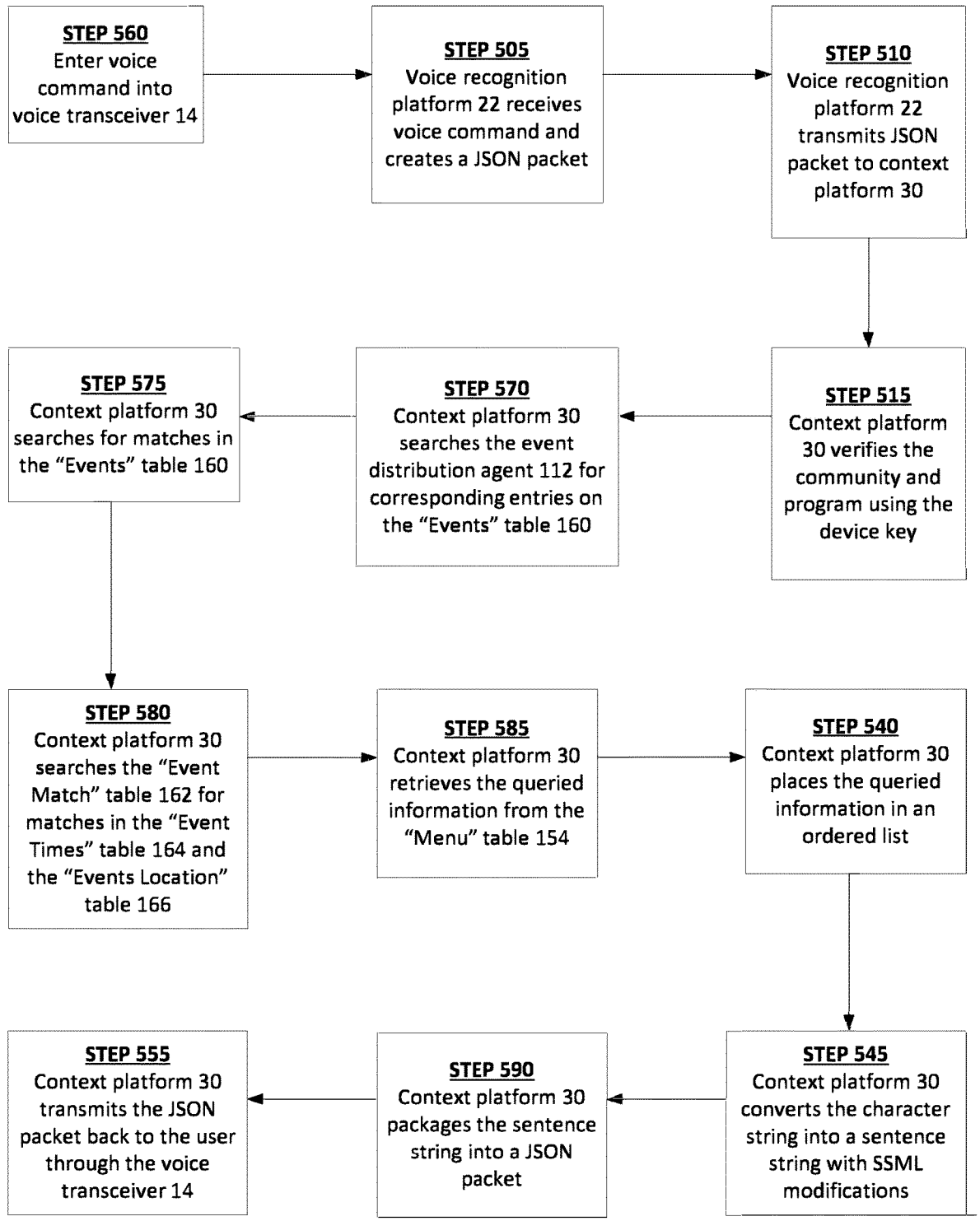
FIG. 5B is a flow diagram of an embodiment of the steps utilized by the system to respond to a query from a user regarding an event.
Figure 5C:
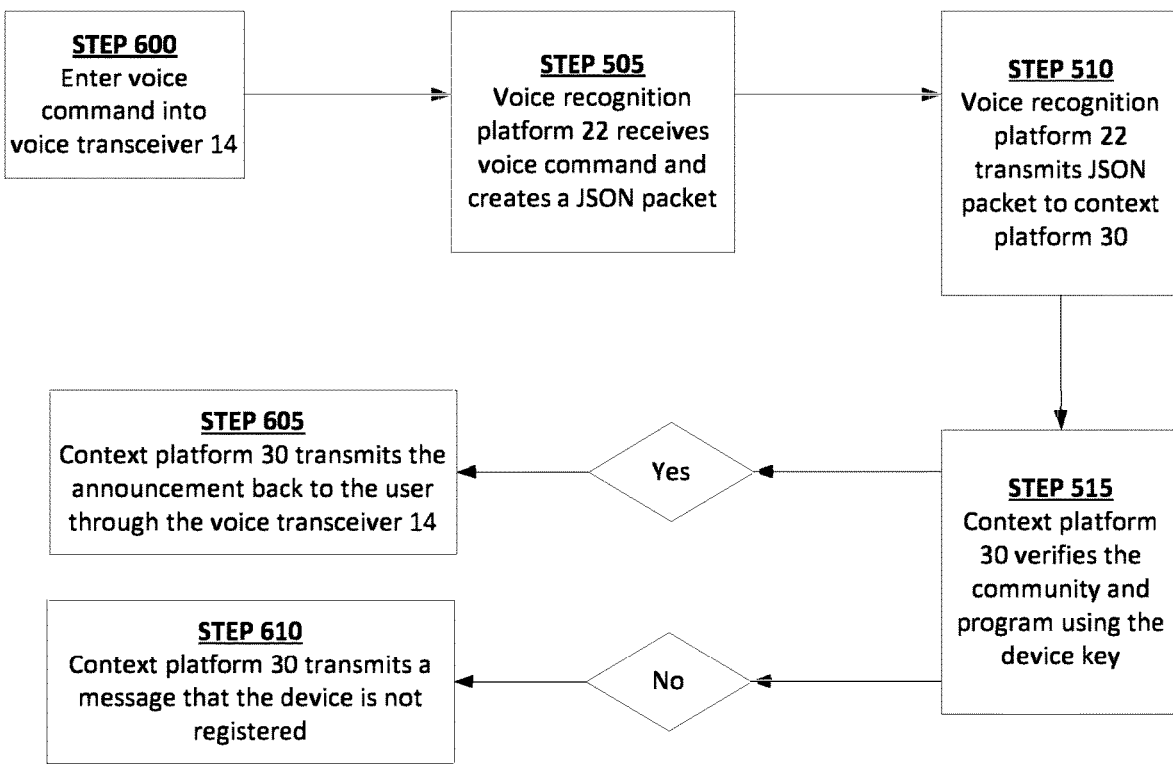
FIG. 5C is a flow diagram of an embodiment of the steps utilized by the system to respond to a query from a user regarding an announcement.

FIGS. 5A, 5B, and 5C are illustrative examples of how the system responds to a query. FIG. 5A is an exemplary embodiment of the system's response to the query "Alexa, ask Connected Living, what's for lunch?" (step 500). The voice command from the voice transceiver 14, an Echo device, is received by and packaged into a JSON data packet by the voice recognition platform 22 (step 505). The JSON packet is transmitted to the context platform 30 (step 510). The JSON data packet further includes a device key to identify information about the device 14. This identification information may include, but is not limited to, the device serial number or internet service provider (ISP) number. The device key is used by the context platform 30 to verify the community and program to which the device 14 is registered (step 515). The keys are used to identify which information is relevant to the device 14.

The community and program information is used to search at least one distribution agent 110 in the context platform 30 (step 520). In this example, since the query is related to dining, the restaurant distribution agent 112 will be searched to identify matches for the query.

The restaurant distribution agent 112 is then used to identify the relevant information stored in a "Restaurant" table 150 (step 525). The "Restaurant" table 150 comprises a complete list of all the dining venues in system. Based on the subset of restaurant names in the "Restaurant" table 150, the context platform 30 will then search a "Restaurant Match" table 152 to determine which entries in a separate "Menu" table 154 correspond to each relevant entry on the "Restaurant" table 150 (step 530). If the user did not specify a date, time or location in the command, the system will default to the current date and time and retrieve menu results for all meals at all permitted dining venues.

The context platform 30 will retrieve the corresponding information on the "Menu" table 154 (step 535) and place the retrieved information in an ordered list (step 540). In some embodiments, the ordered list will provide the menu options based on the time of the meals. For example, the breakfast menu will be read first and the dinner menu will be read last. In some embodiments, the lists may be further ordered based on the order of the meals. For example, the appetizer course will be listed first before the entrée course. In some embodiments, an additional prompt is necessary to retrieve information related to desserts or snacks served at each meal or between meals.

The information retrieved from the tables is in any suitable format, including Unicode format. The context platform 30 subsequently converts the retrieved data into a sentence string comprising SSML modifications (step 545) before packaging it into a JSON packet (step 550). The context platform 30 transmits the JSON packet back to the user through the Echo device 14 (step 575). In other embodiments, a separate processing module 200 may convert the sentence string into JSON data and transmit it to the Echo device. If the Echo device is capable of providing a visual message along with an audio message, then the context platform 30 packages the data in both audio and video formats prior to sending to the Echo device.

FIG. 5B is an exemplary embodiment of the system's response to an event query, such as "Alexa, ask Connected Living, when is yoga?" (step 560). Similar to the embodiment shown in FIG. 5A, the system first verifies the user's community and program using the device key (step 515). Since the query is related to an event, the event distribution agent 112 is used to identify the entries related to yoga in the "Events" table 160 (step 570). The context platform searches for matches in the in the "Events" table 160 based on the data in the event distribution agent 112 (step 575). The context platform 30, subsequently, uses the "Event Match" table 162 to identify entries on separate "Event Times" 164 or "Event Location" 166 tables related to "yoga" (step 580).

The context platform 30 will retrieve the responses from the "Event Times" table 164 and "Event Location" table 166 (step 585), and then place them in an ordered list (step 540). The context platform 30 converts the data into a sentence string with SSML characters (step 545). The response is then packaged into a JSON packet (step 590) before sending it through the voice recognition platform 22 to the vice transceiver 14 for the user (step 555). In some embodiments, the response to queries on events in step 590 will follow a standard format that identifies the event and provides the time and location of the event. For example, all responses on queries related to events may state "Event A will take place at 3:00 PM in Room A."

FIG. 5C is an illustrative example of the system providing users with community messages, photos, and videos when prompted by a user (step 600). For example, when sending community alerts and bulletins to users, the system validates the community and program using the device registration table 142 (steps 515). All verified users in the community are then sent the announcement (step 605). If the device is not verified, then a message is sent that the device is not registered to that community (step 610). The same is true for photos and videos. However, photos and videos will only be sent to users with display interfaces on their devices as determined during registration.

Unless specifically stated otherwise as apparent from the following discussion, it is appreciated that throughout the description, discussions utilizing terms such as "processing" or "computing" "cleaning" or "calculating" or "delaying" or "comparing," "generating" or "determining" or "forwarding or "deferring" "committing" or "interrupting" or "handling" or "receiving" or "buffering" or "allocating" or "displaying" or "flagging" or Boolean logic or other set related operations or the like, refer to the action and processes of a computer system, or electronic device, that manipulates and transforms data represented as physical (electronic) quantities within the computer system's or electronic devices' registers and memories into other data similarly represented as physical quantities within electronic memories or registers or other such information storage, transmission or display devices.

The algorithms presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems is apparent from the description above. In addition, the present invention is not described with reference to any particular programming language, and various embodiments may thus be implemented using a variety of programming languages.

A number of implementations have been described. Nevertheless, it will be understood that various modifications may be made without departing from the spirit and scope of the disclosure. For example, various forms of the flow charts shown may be used, with steps re-ordered, added, or removed. Accordingly, other implementations are within the scope of the following claims.

The examples presented herein are intended to illustrate potential and specific implementations of the present disclosure. The examples are intended primarily for the purposes of illustrating the invention for those skilled in the art. No particular aspect or aspects of the examples are necessarily intended to limit the scope of the present invention.

The figures and descriptions of the present invention have been simplified to illustrate elements that are relevant for a clear understanding of the present invention, while eliminating, for purposes of clarity, other elements. Those of ordinary skill in the art may recognize, however, that these sorts of focused discussions would not facilitate a better understanding of the present disclosure, and therefore, a more detailed description of such elements is not provided herein.

The processes associated with the present embodiments may be executed by programmable equipment, such as computers. Software or other sets of instructions that may be employed to cause programmable equipment to execute the processes may be stored in any storage device, such as, for example, a computer system (non-volatile) memory, an optical disk, magnetic tape, or magnetic disk. Furthermore, some of the processes may be programmed when the computer system is manufactured or via a computer-readable memory medium.

It can also be appreciated that certain process aspects described herein may be performed using instructions stored on a computer-readable memory medium or media that direct a computer or computer system to perform process steps. A computer-readable medium may include, for example, memory devices such as diskettes, compact discs of both read-only and read/write varieties, optical disk drives, and hard disk drives. A computer-readable medium may also include memory storage that may be physical, virtual, permanent, temporary, semi-permanent and/or semi-temporary.

Computer systems and computer-based devices disclosed herein may include memory for storing certain software applications used in obtaining, processing, and communicating information. It can be appreciated that such memory may be internal or external with respect to operation of the disclosed embodiments. The memory may also include any means for storing software, including a hard disk, an optical disk, floppy disk, ROM (read only memory), RAM (random access memory), PROM (programmable ROM), EEPROM (electrically erasable PROM) and/or other computer-readable memory media. In various embodiments, a "host," "engine," "loader," "filter," "platform," or "component" may include various computers or computer systems, or may include a reasonable combination of software, firmware, and/or hardware.

In various embodiments of the present disclosure, a single component may be replaced by multiple components, and multiple components may be replaced by a single component, to perform a given function or functions. Except where such substitution would not be operative to practice embodiments of the present disclosure, such substitution is within the scope of the present disclosure. Any of the servers, for example, may be replaced by a "server farm" or other grouping of networked servers (e.g., a group of server blades) that are located and configured for cooperative functions. It can be appreciated that a server farm may serve to distribute workload between/among individual components of the farm and may expedite computing processes by harnessing the collective and cooperative power of multiple servers. Such server farms may employ load-balancing software that accomplishes tasks such as, for example, tracking demand for processing power from different machines, prioritizing and scheduling tasks based on network demand, and/or providing backup contingency in the event of component failure or reduction in operability.

In general, it may be apparent to one of ordinary skill in the art that various embodiments described herein, or components or parts thereof, may be implemented in many different embodiments of software, firmware, and/or hardware, or modules thereof. The software code or specialized control hardware used to implement some of the present embodiments is not limiting of the present disclosure. Programming languages for computer software and other computer-implemented instructions may be translated into machine language by a compiler or an assembler before execution and/or may be translated directly at run time by an interpreter.

Examples of assembly languages include ARM, MIPS, and x86; examples of high level languages include Ada, BASIC, C, C++, C#, COBOL, Fortran, Java, Lisp, Pascal, Object Pascal; and examples of scripting languages include Bourne script, JavaScript, Python, Ruby, PHP, and Perl. Various embodiments may be employed in a Lotus Notes environment, for example. Such software may be stored on any type of suitable computer-readable medium or media such as, for example, a magnetic or optical storage medium. Thus, the operation and behavior of the embodiments are described without specific reference to the actual software code or specialized hardware components. The absence of such specific references is feasible because it is clearly understood that artisans of ordinary skill would be able to design software and control hardware to implement the embodiments of the present disclosure based on the description herein with only a reasonable effort and without undue experimentation.

Various embodiments of the systems and methods described herein may employ one or more electronic computer networks to promote communication among different components, transfer data, or to share resources and information. Such computer networks can be classified according to the hardware and software technology that is used to interconnect the devices in the network.

The computer network may be characterized based on functional relationships among the elements or components of the network, such as active networking, client-server, or peer-to-peer functional architecture. The computer network may be classified according to network topology, such as bus network, star network, ring network, mesh network, star-bus network, or hierarchical topology network, for example. The computer network may also be classified based on the method employed for data communication, such as digital and analog networks.

Embodiments of the methods, systems, and tools described herein may employ internetworking for connecting two or more distinct electronic computer networks or network segments through a common routing technology. The type of internetwork employed may depend on administration and/or participation in the internetwork. Non-limiting examples of internetworks include intranet, extranet, and Internet. Intranets and extranets may or may not have connections to the Internet. If connected to the Internet, the intranet or extranet may be protected with appropriate authentication technology or other security measures. As applied herein, an intranet can be a group of networks which employ Internet Protocol, web browsers and/or file transfer applications, under common control by an administrative entity. Such an administrative entity could restrict access to the intranet to only authorized users, for example, or another internal network of an organization or commercial entity.

Unless otherwise indicated, all numbers expressing lengths, widths, depths, or other dimensions and so forth used in the specification and claims are to be understood in all instances as indicating both the exact values as shown and as being modified by the term "about." As used herein, the term "about" refers to a ±10% variation from the nominal value. Accordingly, unless indicated to the contrary, the numerical parameters set forth in the specification and attached claims are approximations that may vary depending upon the desired properties sought to be obtained. At the very least, and not as an attempt to limit the application of the doctrine of equivalents to the scope of the claims, each numerical parameter should at least be construed in light of the number of reported significant digits and by applying ordinary rounding techniques. Any specific value may vary by 20%.

The invention may be embodied in other specific forms without departing from the spirit or essential characteristics thereof. The foregoing embodiments are therefore to be considered in all respects illustrative rather than limiting on the invention described herein. Scope of the invention is thus indicated by the appended claims rather than by the foregoing description, and all changes which come within the meaning and range of equivalency of the claims are intended to be embraced therein.

It will be appreciated by those skilled in the art that various modifications and changes may be made without departing from the scope of the described technology. Such modifications and changes are intended to fall within the scope of the embodiments that are described. It will also be appreciated by those of skill in the art that features included in one embodiment are interchangeable with other embodiments; and that one or more features from a depicted embodiment can be included with other depicted embodiments in any combination. For example, any of the various components described herein and/or depicted in the figures may be combined, interchanged, or excluded from other embodiments.

The invention claimed is:

1. A method for interpreting data transferred from a voice recognition platform, the voice recognition platform data comprising a designator, device identification, a query or command, and a plurality of variables, the method comprising the steps of:

receiving, by a context platform, a recognition string from the voice recognition platform, the recognition string comprising the designator, the query or command, and at least one variable of the plurality of variables;

generating, by the context platform, an instruction string from the recognition string, the instruction string comprising the designator, the query or command and the at least one variable of the plurality of variables;

removing, by the context platform, extraneous symbols from the instruction string to generate a cleaned instruction string comprising the designator, a cleaned query or cleaned command, and at least one cleaned variable of the plurality of variables;

searching, by the context platform, a context platform database corresponding to the designator, for context platform data corresponding to the cleaned query or clean command, to generate a list of designator data entries;

searching, by the context platform, the list of designator data entries for an exact match between the designator data entries and the at least one cleaned variable;

if exact match exists, returning the designator data entries corresponding to the exact match with the at least one cleaned variable;

if exact match does not exist, searching for a partial match between the designator data entries and the at least one cleaned variable;

if partial matches exist, returning designator data entries corresponding to the partial matches between the designator data entries and the at least one cleaned variable;

if one or more partial matches do not exist, dividing the at least one cleaned variable of the plurality of variables into a list of individual cleaned variables;

searching, by the context platform, the list of designator data entries for an exact match between the designator data entries and each cleaned variable in the list of the plurality of cleaned variables sequentially starting with the first cleaned variable in the list;

as each cleaned variable in the list is searched, returning the designator data entries that correspond to the first variable matched in the sequential search;

if multiple designator data entries are found, returning all such designator data entries; and if no designator entries are found, returning a default value.

2. The method of claim 1, wherein the searching of the database comprises searching a plurality of data tables.

3. The method of claim 2, wherein the plurality of data tables each comprise data for communities, programs, device identification, various events, menus, photos, videos, and notices.

4. The method of claim 1, further comprising packaging the recognition string into JavaScript Object Notation packages to transmit and receive the recognition string.

5. The method of claim 2, further wherein searching the database comprises only searching the data tables that are relevant to the query, community, and program of the device.

6. A context platform for connecting to and interpreting data transfer from a voice recognition platform, the voice recognition platform data comprising a designator, device identification, a query or command, and at least one variable of a plurality of variables, the context platform comprising:

a context platform memory;

a context platform processor in communication with the context platform memory; and a context platform database in communication with the context platform processor, the context platform database comprising a plurality of datasets, each dataset corresponding to a respective designator, wherein the context platform memory receives and stores a recognition string from the voice recognition platform, the recognition string comprising the designator, the query or command, and at least one variable of the plurality of variables, wherein the context platform processor generates an instruction string from the recognition string, the instruction string comprising the designator, the query or command and the at least one variable of the plurality of variables, wherein the context platform processor removes extraneous symbols from the instruction string to generate a cleaned instruction string comprising the designator, a cleaned query or cleaned command, and at least one cleaned variable of the plurality of variables, wherein the context platform processor searches the context platform database corresponding to the designator for designator data entries corresponding to the cleaned query or cleaned command to generate a list of designator data entries corresponding to the cleaned query or cleaned command;

wherein the context platform processor searches the list of designator data entries for an exact match between the designator data entries and the cleaned variable, and if exact match exists, returns the matched designator data entries, and wherein if exact match does not exist, the context platform processor searches for a partial match between the designator data entries and the cleaned variable, and if partial matches exist, returns the designator data entries corresponding to the partial match, and if partial match does not exist, the context platform processor divides the at least one cleaned variable of the plurality of cleaned variables into a list of individual cleaned variables and sequentially searches the designator data entries for an exact match between the designator data entries and each cleaned variable in the list of the plurality of variables, starting with the first cleaned variable in the list, wherein as each cleaned variable in the list is searched, the context platform processor returns the designator data entries that correspond to the first cleaned variable matched in the sequential search, and if multiple designator data entries are found, returns all designator data entries that correspond to the first cleaned variable matched in the sequential search, and if no designator data entries are found, return default.

7. The server of claim 6, wherein the context platform database comprises searching a plurality of data tables.

8. The server of claim 7, wherein the plurality of data tables each comprise data for communities, programs, device identification, various events, menus, photos, videos, and notices.

9. The server of claim 6, wherein the instruction string is packaged into JavaScript Object Notation packages by the context platform processor for transmission.

10. The server of claim 7, wherein the context platform processor only searches the data tables that are relevant to the query, community, and program of the device, when searching the database.

11. A computer system for interpreting voice queries, the computer system comprising:
- a voice recognition platform generating a recognition string comprising a designator, device identification, a query or command, and a plurality of variables in response to a voice query by a user, the voice recognition platform in communication with a context platform, the context platform comprising:
  - a context platform communication module in communication with the voice recognition platform and capable of receiving the recognition string from the voice recognition platform; and
  - a context platform database configured to interface with the context platform communication module comprising a plurality of application programming interfaces,
- wherein the voice recognition platform receives a query or command from a user comprising at least a designator, a query or command, and a plurality of variables,
- wherein the context platform communication module generates an instruction string from the recognition string, the instruction string comprising the designator, the query and the at least one variable of the plurality of values,
- wherein the context platform communication module removes extraneous symbols from the instruction string to generate a cleaned instruction string comprising the designator, a cleaned query or command, and a cleaned variable of the plurality of variables,
- wherein the context platform communication module searches the plurality of application programming interfaces on the database corresponding to the designator for data corresponding to the cleaned query or cleaned command to generate a list of designator data entries,
- wherein the context platform communication module searches for an exact match between the designator data entries and the cleaned variable, and, if exact match exists, returns the matching designator data entries,
- wherein if an exact match does not exist, the context platform communication module looks for partial match between the designator data entries and the cleaned variable, and, if partial match exists, returns designator data entries corresponding to the partial match, and
- wherein if a partial match does not exist, the context platform communication module divides the at least one cleaned variable of the plurality of cleaned variables into a list of individual cleaned variable components and searches the designator data entries for an exact match between the designator data entries and each cleaned variable component sequentially starting with the first cleaned variable component in the list,
- wherein as each variable in the list is searched, the designator data entries that correspond to the first variable matched in the sequential search is returned as a response string, and if multiple designator data entries are found, return all designator data entries as a response string, and if no designator entries are found, return a default response as a response string.

12. The system of claim 11, wherein the server database comprises a plurality of data tables.

13. The system of claim 12, wherein the plurality of data tables each comprise data for communities, programs, device identification, various events, menu, photos, videos, and notices.

14. The system of claim 11, wherein the recognition string is packaged into JavaScript Object Notation packages by the voice recognition platform to transmit to the context platform.

15. The server of claim 11, wherein a search of the server processor only searches the data tables that are relevant to the query, community, and program of the device when searching the context platform database.

16. A method for interpreting data transferred from a voice recognition platform, the voice recognition platform data comprising a designator, device identification, a query or command, and a plurality of variables, the method comprising the steps of:
- receiving, by a context platform, a recognition string from the voice recognition platform, the recognition string comprising the designator, the query or command, and at least one variable of the plurality of variables;
- generating, by the context platform, an instruction string from the recognition string, the instruction string comprising the designator, the query or command and the at least one variable of the plurality of variables;
- removing, by the context platform, extraneous symbols from the instruction string to generate a cleaned instruction string comprising the designator, a cleaned query or cleaned command, and at least one cleaned variable of the plurality of variables;
- searching, by the context platform, a context platform database corresponding to the designator, for context platform data corresponding to the cleaned query or clean command, to generate a list of designator data entries;
- searching, by the context platform, the list of designator data entries for an exact match between the designator data entries and the at least one cleaned variable;
- if partial matches exist between the designator data entries and the at least one cleaned variable, returning designator data entries corresponding to the partial matches between the designator data entries and the at least one cleaned variable; and
- if one or more partial matches do not exist between the designator data entries and the at least one cleaned variable, dividing the at least one cleaned variable of the plurality of variables into a list of individual cleaned variables.

17. The method of claim 16, further comprising:
- if an exact match exists between the designator data entries and the at least one cleaned variable, returning the designator data entries corresponding to the exact match with the at least one cleaned variable.

18. The method of claim 16, further comprising:
- if an exact match does not exist between the designator data entries and the at least one cleaned variable, searching for a partial match between the designator data entries and the at least one cleaned variable.

19. The method of claim 16, further comprising:
- searching, by the context platform, the list of designator data entries for an exact match between the designator data entries and each cleaned variable in the list of the plurality of cleaned variables sequentially starting with the first cleaned variable in the list.

20. The method of claim 19, further comprising:
- as each cleaned variable in the list is searched, returning the designator data entries that correspond to the first variable matched in the sequential search;
- if multiple designator data entries are found, returning all designator data entry returned; and if no designator entries are found, returning a default value.

\* \* \* \* \*